(12) United States Patent
Smith et al.

(10) Patent No.: US 8,545,665 B2
(45) Date of Patent: *Oct. 1, 2013

(54) PROCESS FOR THE MANUFACTURE OF A DECORATIVE LAMINATE

(75) Inventors: Patrick Smith, Raleigh, NC (US); Krister Hansson, Trelleborg (SE); Ake Sjoberg, Lund (SE); Roland Larsson, Trelleborg (SE)

(73) Assignee: Pergo (Europe) AB, Trelleborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/369,009

(22) Filed: Feb. 8, 2012

(65) Prior Publication Data

US 2012/0141749 A1    Jun. 7, 2012

Related U.S. Application Data

(63) Continuation of application No. 11/007,225, filed on Dec. 9, 2004.

(60) Provisional application No. 60/528,480, filed on Dec. 11, 2003.

(51) Int. Cl.
*B32B 27/00* (2006.01)
*B29C 65/00* (2006.01)

(52) U.S. Cl.
USPC ........................... 156/307.7; 156/281

(58) Field of Classification Search
USPC ............... 156/307.1, 307.4, 307.7, 311, 498, 156/281, 282, 307.3; 428/530, 535, 537.1, 428/537.5; 264/348, 237
See application file for complete search history.

(56) References Cited

U.S. PATENT DOCUMENTS

| | | | |
|---|---|---|---|
| 4,170,511 A * | 10/1979 | Milne | 156/498 |
| 4,392,909 A | 7/1983 | Bohn et al. | |
| 4,505,974 A * | 3/1985 | Hosler | 428/329 |
| 4,909,886 A | 3/1990 | Noguchi | |
| 5,288,540 A | 2/1994 | Albrinck et al. | |
| 5,571,368 A * | 11/1996 | Barge | 156/359 |
| 5,654,091 A | 8/1997 | Kiriazis et al. | |
| 5,716,697 A | 2/1998 | Meeker | |
| 6,126,883 A * | 10/2000 | Troetscher et al. | 264/348 |
| 6,372,169 B1 * | 4/2002 | Yasuda | 264/172.19 |
| 6,652,955 B1 | 11/2003 | Plug | |
| 7,150,134 B2 | 12/2006 | Kornfalt et al. | |
| 2003/0010427 A1 | 1/2003 | Cruz | |
| 2012/0141749 A1 | 6/2012 | Smith et al. | |

FOREIGN PATENT DOCUMENTS

| | | |
|---|---|---|
| DE | 10 61 497 | 7/1959 |
| DE | 1 33 921 | 1/1979 |
| DE | 19926155 | 12/2000 |
| DE | 19939060 A1 * | 2/2001 |
| DE | 199 41 300 | 3/2001 |
| EP | 11 86 708 | 3/2002 |
| JP | 2001-105407 | 4/2001 |
| WO | WO 97/00172 | 1/1997 |
| WO | WO 01/72512 | 10/2001 |
| WO | WO 02/22953 | 3/2002 |

OTHER PUBLICATIONS

Trane "Indoor Air Quality a Guide to Understanding ASHRAE Standard 62-2001" Feb. 2002.*
"Thyroid and Antithyroid Preparations to Vinyl Polymers," Encyclopedia of Chemical Technology, 1983, vol. 23, 3rd Edition, John Wiley & Sons, USA.
Non-Final Office Action for U.S. Appl. No. 11/007,225 dated Dec. 12, 2006.
Final Office Action for U.S. Appl. No. 11/007,225 dated Jun. 5, 2007.
Examiner Interview Summary for U.S. Appl. No. 11/007,225 dated Jan. 28, 2008.
Non-Final Office Action for U.S. Appl. No. 11/007,225 dated Mar. 20, 2008.
Final Office Action for U.S. Appl. No. 11/007,225 dated Dec. 1, 2008.
Non-Final Office Action for U.S. Appl. No. 11/007,225 dated Apr. 29, 2009.
Final Office Action for U.S. Appl. No. 11/007,225 dated Oct. 19, 2009.

* cited by examiner

*Primary Examiner* — John Goff
(74) *Attorney, Agent, or Firm* — Jenkins, Wilson, Taylor & Hunt, P.A.

(57) ABSTRACT

A process for the manufacture of a decorative board, which board, on its upper surface includes a decorative layer and a wear layer of cellulose and thermosetting amino resin. A decorative layer and wear layer is applied as a surface layer on a base layer and bonded thereto by pressing under elevated temperature and pressure in a laminate press. The wear layer, the decor layer and the base layer are arranged to form a stack of layers. The stack of layers are fed into a laminate press and pressed therein under heat and pressure where at least the upper surface becomes heated. The decorative board is acquired from the laminate press whereupon a forced cooling of the decorative board is initiated in order to bring the surface temperature of the decorative board down.

10 Claims, No Drawings

PROCESS FOR THE MANUFACTURE OF A DECORATIVE LAMINATE

CROSS-REFERENCE TO RELATED APPLICATION

This application is a continuation of U.S. patent application Ser. No. 11/007,225 filed Dec. 9, 2004, which claims the benefit of U.S. Provisional Application No. 60/528,480, filed Dec. 11, 2003 the entire disclosure of which are herein incorporated by reference.

The present invention relates to a process for the manufacture of a decorative thermosetting laminate by means of a laminate press.

Products coated with thermosetting laminates are frequent today. They are foremost used where the demand for abrasion resistance is high, but also where resistance towards different chemicals and moisture is required. As an example of such products floors, floor beadings, table tops, work tops and wall panels can be mentioned.

The thermosetting laminate most often consists of a carrying base with a decor sheet and one or more wear layers placed closest to the surface. The decor sheet can be provided with a desired decor or pattern. The most frequent patterns usually represent the image of different kinds of wood, or minerals such as marble or granite. The surface of the laminate can be provided with a structure during the laminating procedure which will make the decor more realistic. The most common way of achieving such a laminate is by first manufacturing the thermosetting laminate of a number of paper layers impregnated with melamine formaldehyde resin and then to glue this thermosetting laminate onto a core of for example fibre board or particle board. It is also known to feed a few melamine formaldehyde impregnated paper webs together with sheets of particle or fibre board through a continuous laminate press. The problem is that the laminate will change format somewhat which will cause problems with warping due to changes in moisture content. The same problem occurs in both continuous and discontinuous processes.

According to the present invention the above mentioned problems have been solved and a process for manufacturing a laminate including a conditioning procedure has been achieved. Accordingly the present invention relates to a process for the manufacture of a decorative board, which board, on its upper surface includes a decorative layer and a wear layer, said decorative layer and wear layer comprise cellulose and thermosetting amino resin. The decorative layer and wear layer is applied as a surface layer on a base layer and bonded thereto by pressing under elevated temperature and pressure in a laminate press. The wear layer, the decor layer and the base layer are arranged to form a stack of layers. The stack of layers is then fed into a laminate press and pressed therein under increased pressure and increased temperature so that the different layers are bonded to form a unit, through which process, at least the upper surface becomes heated. The decorative board is then acquired from the laminate press whereupon a forced cooling of the decorative board is initiated in order to bring the surface temperature of the decorative board down. The cooling process is started as soon as possible after the lamination procedure in order to prevent the heat to dissipate into the base layer. The heat will lower the moisture content of the base layer to a level lower than the equilibrium moisture content during normal use. The base layer will of course absorb moisture so that equilibrium is eventually achieved, but during this process undesired warping of the decorative board may occur.

The base layer is in preferred embodiments constituted of a particle board, a medium density fibre board or a high density fibre board with a thickness in the range 3-30 mm.

The base layer is preconditioned to a predetermined temperature prior to the lamination process.

The cooling is preferably achieved by means of convection cooling by blowing an air stream over the surface of the decorative board. The air in the air stream is suitably conditioned to a specific moisture content range and a specific temperature range. The cooling process is suitably divided into a two stage process, the first stage being a forced narrow high pressure air stream blown over the surface of the decorative board as soon as possible after the lamination procedure, followed by stage two, being a slower cooling process where the air used for cooling is conditioned to a specific temperature range and moisture content. The drying of the laminate below equilibrium moisture levels for normal use will hereby be radically limited and one of the reasons to problems with warping of finished products can be limited to a controllable level.

According to one embodiment of the invention the pressure in the laminate press is in the range 5-90 Bar, preferably 15-70 Bar, while the temperature is in the range 140-260° C. preferably 160-200° C.

According to one embodiment of the invention the decorative boards comprises a wear layer which is constituted by at least one web or sheet of cellulose impregnated with melamine formaldehyde resin. The wear layer may also include small hard particles of, for example, silicon oxide, silicon carbide or aluminium oxide. The small hard particles may for example be incorporated in the pulp during manufacturing of the cellulose web, sprinkled on the wet lacquer during the impregnation procedure or incorporated in the lacquer used for impregnation. Also the decor sheet is suitably made of cellulose which is impregnated with melamine formaldehyde resin.

The base layer is suitably preconditioned to a predetermined moisture content and temperature prior to being provided with a decor sheet.

Also the decor sheet and the wear layer is suitably also preconditioned to a predetermined moisture content and temperature prior to being applied on the base layer.

The decorative layer is suitably provided with a surface structure. This is suitably achieved by means of any known technique of embossing.

The invention claimed is:

1. A process for the manufacture of a decorative board, the process comprising:
    preconditioning a base layer to a predetermined temperature
    arranging a decorative layer and a wear layer on an upper surface of the preconditioned base layer to form a stack of layers, the decorative layer and wear layer comprising cellulose and thermosetting amino resin;
    feeding the stack of layers into a laminate press;
    pressing the stack of layers under increased pressure and increased temperature so that the stack of layers are bonded to form a decorative board;
    removing the decorative board from the laminate press; and
    convectively cooling the decorative board;
    wherein convectively cooling the decorative board comprises a two stage cooling process comprising:
        a first stage comprising blowing a first air stream over the upper surface of the decorative board after removing the decorative board from the laminate press; and
        a second stage comprising subsequently blowing a second air stream over the upper surface of the decorative board, wherein air in the second air stream is conditioned to a moisture content range and a temperature range selected to limit warping of the decorative board;

wherein the first stage and the second stage are performed at different speeds.

2. The process of claim 1, wherein the decorative layer comprises at least one web or sheet of cellulose impregnated with melamine formaldehyde resin.

3. The process of claim 1, wherein the wear layer comprises at least one web or sheet of cellulose impregnated with melamine formaldehyde resin.

4. The process of claim 2, wherein the wear layer comprises small hard particles selected from the group consisting of silicon oxide, silicon carbide, and aluminum oxide.

5. The process of claim 4, wherein the small hard particles are incorporated in a pulp from which the cellulose web is formed, sprinkled on a wet lacquer during an impregnation procedure, or incorporated in the lacquer used for impregnation.

6. The process of claim 1, wherein pressing the stack of layers under increased pressure and increased temperature comprises heating at least the upper surface of the decorative board.

7. The process of claim 1, wherein blowing the first air stream over the upper surface of the decorative board comprises blowing air that is conditioned to a moisture content range selected to limit warping of the decorative board.

8. The process of claim 1, wherein blowing the first air stream over the upper surface of the decorative board comprises blowing air that is conditioned to a temperature range selected to limit warping of the decorative board.

9. The process of claim 1, comprising preconditioning the decor sheet and the wear layer to a predetermined temperature prior to being applied on the preconditioned base layer.

10. The process of claim 1, wherein the second stage is a slower cooling process than the first stage.

* * * * *